(12) United States Patent
Holt et al.

(10) Patent No.: US 8,714,139 B2
(45) Date of Patent: May 6, 2014

(54) DUAL-PHASE SPRING ASSEMBLY FOR USE WITH FUEL INJECTOR SYSTEM

(75) Inventors: Jason D. Holt, St. Charles, IL (US); Glenn G. Heavens, Cheshire, CT (US); James D. Jones, Barrington, IL (US); Robert R. Schaser, Hampshire, IL (US); Jeremy R. D. Tuttle, Dearborn, MI (US)

(73) Assignee: Illinois Tool Works Inc., Glenview, IL (US)

( * ) Notice: Subject to any disclaimer, the term of this patent is extended or adjusted under 35 U.S.C. 154(b) by 462 days.

(21) Appl. No.: 13/140,077

(22) PCT Filed: Dec. 10, 2009

(86) PCT No.: PCT/US2009/067451
§ 371 (c)(1),
(2), (4) Date: Jun. 16, 2011

(87) PCT Pub. No.: WO2010/082991
PCT Pub. Date: Jul. 22, 2010

(65) Prior Publication Data
US 2011/0247591 A1  Oct. 13, 2011

Related U.S. Application Data

(60) Provisional application No. 61/145,346, filed on Jan. 16, 2009.

(51) Int. Cl.
*F02M 61/14* (2006.01)
*F16F 3/12* (2006.01)
*F02M 61/16* (2006.01)
*F16J 15/32* (2006.01)

(52) U.S. Cl.
CPC ............. *F02M 61/14* (2013.01); *F02M 61/167* (2013.01); *F16F 3/12* (2013.01); *F16J 15/32* (2013.01); *F02M 2200/858* (2013.01)

USPC ............................ 123/470; 267/152; 277/591

(58) Field of Classification Search
CPC ..... F16J 15/32; F16J 15/3204; F16J 15/3216; F16J 15/3212; F16J 15/3228; F02M 61/14; F02M 61/167; F02M 61/168; F02M 2200/85; F02M 2200/851; F02M 2200/858; F02M 2200/9015; F02M 2200/9046; F16F 3/12
USPC .......... 123/470; 277/377, 379, 380, 382, 383, 277/384, 386, 394, 395, 399, 591; 267/152
See application file for complete search history.

(56) References Cited

U.S. PATENT DOCUMENTS 2,729,482 A * 1/1956 Kosatka ......................... 277/573
3,595,588 A * 7/1971 Rode .............................. 277/650

(Continued)

OTHER PUBLICATIONS

ISR for PCT/US2009/067451 dated Feb. 4, 2010.

(Continued)

*Primary Examiner* — Thomas Moulis
(74) *Attorney, Agent, or Firm* — Mark W. Croll; Paul F. Donovan

(57) ABSTRACT

A dual-phase spring assembly configured for use with a fuel injector system includes a metal main body and a rubber ring. The main body includes a base integrally connected to a circumferential wall having a radially-canted lip. The base defines a central opening. The radially-canted lip angles away from a center of the main body. The rubber ring secures over the base and to an internal surface of the circumferential wall. The rubber ring covers a ledge of the base, while the radially-canted lip is exposed. The rubber ring is configured to directly abut at least a first portion of the fuel injector system, and the radially-canted lip is configured to directly abut a second portion of the fuel injector system.

20 Claims, 5 Drawing Sheets

(56) References Cited

U.S. PATENT DOCUMENTS

| | | | | |
|---|---|---|---|---|
| 3,770,181 | A * | 11/1973 | Stahl | 277/404 |
| 3,857,574 | A * | 12/1974 | Artzer | 277/606 |
| 4,428,586 | A * | 1/1984 | Romero | 277/565 |
| 4,528,959 | A * | 7/1985 | Hauser, Jr. | 123/470 |
| 4,819,999 | A * | 4/1989 | Livesay et al. | 305/103 |
| 5,577,472 | A | 11/1996 | Banta, III et al. | |
| 5,655,781 | A * | 8/1997 | Petrak | 277/371 |
| 5,706,787 | A * | 1/1998 | Fujikawa | 123/470 |
| 6,283,479 | B1 * | 9/2001 | Jan | 277/591 |
| 6,460,512 | B1 | 10/2002 | Serio | |
| 6,745,956 | B1 * | 6/2004 | Bantle et al. | 239/533.3 |
| 6,840,226 | B2 * | 1/2005 | Hans | 123/470 |
| 7,293,550 | B2 | 11/2007 | Beardmore | |
| 7,314,219 | B1 * | 1/2008 | Horvath et al. | 277/551 |
| 7,640,917 | B2 * | 1/2010 | Daniel et al. | 123/470 |
| 7,827,964 | B2 * | 11/2010 | Chern et al. | 123/470 |
| 7,918,209 | B2 * | 4/2011 | Fischetti et al. | 123/470 |
| 8,336,887 | B2 * | 12/2012 | Petrak | 277/577 |
| 2003/0201612 | A1 * | 10/2003 | Neumaier | 277/591 |
| 2007/0113828 | A1 | 5/2007 | Fonville et al. | |
| 2007/0228662 | A1 | 10/2007 | Reiter et al. | |
| 2008/0246228 | A1 * | 10/2008 | Hanneke et al. | 277/595 |
| 2008/0265520 | A1 | 10/2008 | Kurth | |
| 2009/0121442 | A1 * | 5/2009 | Uozumi et al. | 277/381 |
| 2010/0186717 | A1 * | 7/2010 | Scheffel | 123/470 |

OTHER PUBLICATIONS

Supplemental European Search Report for EP 09 83 8559 dated Feb. 20, 2013.

\* cited by examiner

DUAL-PHASE SPRING ASSEMBLY FOR USE WITH FUEL INJECTOR SYSTEM

RELATED APPLICATIONS

This application is national phase of PCT/US2009/067451 filed Dec. 10, 2009 and relates to and claims priority benefits from U.S. Provisional Patent Application No. 61/145,346 entitled "Dual Phase Spring For Use With Fuel Injector," filed Jan. 26, 2009, which is hereby incorporated by reference in its entirety.

FIELD OF EMBODIMENTS OF THE INVENTION

Embodiments of the present invention generally relate to a fuel injector system for an internal combustion engine, and more particularly, to a fuel injector system including a dual-phase spring assembly.

BACKGROUND

Conventional fuel injector isolating members are disclosed in U.S. Pat. No. 7,293,550, entitled "Fuel Injector Isolation Seat," and United States Patent Application Publication No. 2007/0113828, entitled "Fuel Injector Isolating and Sealing Member."

FIG. 1 illustrates a front view of a conventional fuel injector system 10 within a cylinder head 12 of an internal combustion engine. The cylinder head 12 includes a stepped injector bore 14 that receives at least a portion of the fuel injector system 10. The fuel injector system 10 includes a main body 16 and a tip 18 extending axially from the main body 16.

The injector bore 14 includes a main chamber 20 into which the main body 16 of the fuel injector system 10 is positioned. The injector bore 14 also includes a tapered chamber 22 into which the tip 18 passes.

In operation, the fuel injector system 10 delivers a predetermined amount of fuel directly to a combustion chamber 24. An annular combustion seal 26 is secured around a shaft of the tip 18. The combustion seal 26 sealingly engages a portion of the cylinder head proximate an end of the tapered chamber 22 and the tip 18, thereby preventing gases within the combustion chamber 24 from passing upwardly into the tapered chamber 22.

An annular alignment ring 28 is seated on an internal ledge 30 of the cylinder head 12 proximate the junction of the main chamber 20 and the tapered chamber 22. The alignment ring 28 is typically a metal ring that provides a hard contact point between the cylinder head 12 and the main body 16 of the fuel injector system 14. Although, as shown and described in U.S. Pat. No. 7,293,550, an elastomeric ring member and a cupped spring washer may be used instead of the isolation ring 28 shown in FIG. 1.

In general, however, the alignment ring provides the same spring rate during the entire range of engine operation. Moreover, a separate component is typically used to ensure that an isolation ring secures between the fuel injector system to the isolation ring.

SUMMARY OF EMBODIMENTS OF THE INVENTION

Certain embodiments of the present invention provide a dual-phase spring assembly configured for use with a fuel injector system. The assembly may include a metal main body and a rubber ring.

The main body includes a base integrally connected to a circumferential wall having a radially-canted lip. The base defines a central opening. The radially canted lip angles away from a center of the main body.

The rubber ring secures over the base and to an internal surface of the circumferential wall. The rubber ring may be bonded to the base and covers a ledge of the base. The radially-canted lip is exposed. That is, the radially-canted lip is not covered by the rubber ring. The rubber ring is configured to directly abut at least a first portion of the fuel injector system, and the radially-canted lip is configured to directly abut a second portion of the fuel injector system.

The radially-canted lip and the rubber ring are configured to cooperate to securely retain the fuel injector system in an aligned position with respect to a cylinder head of an internal combustion engine. The radially-canted lip is angled to conform to a portion of the fuel injector system.

An inner edge of the rubber ring may extend past an inner edge of the base towards the central opening.

The circumferential wall and the base define an internal cavity. The rubber ring is contained within the internal cavity.

Certain embodiments of the present invention provide an internal combustion engine system that includes a cylinder head, a fuel injector and a dual-phase spring assembly. The cylinder head may include a fuel injector bore having a main chamber in communication with a tapered chamber.

The fuel injector may include a main injector body and a tip axially extending from the main injector body. At least a portion of the main injector body is positioned within the main chamber. At least a portion of the tip is positioned within the tapered chamber.

The dual-phase spring assembly aligns the fuel injector within the cylinder head. The assembly includes a metal main body comprising a base integrally connected to a circumferential wall having a radially-canted lip. The base defines a central opening. The radially canted lip angles away from a center of the main body.

A rubber ring secures over the base and to an internal surface of the circumferential wall. The rubber ring covers a ledge of the base, whereas the radially-canted lip is exposed such that the rubber ring does not touch it. The rubber ring directly abuts at least a first portion of the main injector body. The radially-canted lip directly abuts a second portion of the main injector body.

Figure 1:
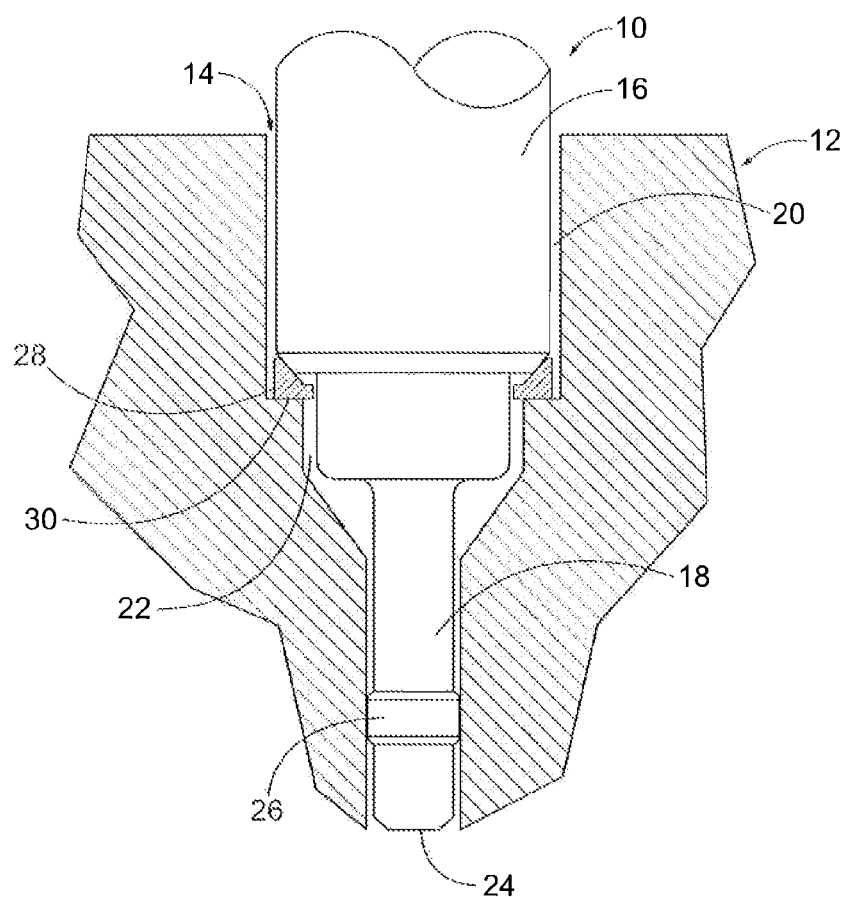
FIG. 1 illustrates a front view of a conventional fuel injector system within a cylinder head of an internal combustion engine.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

Figure 2:
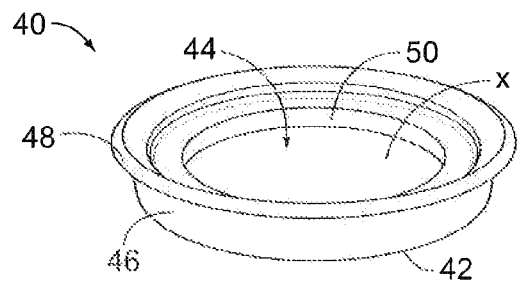
FIG. 2 illustrates an isometric top view of a dual-phase spring assembly, according to an embodiment of the present invention.
Figure 3:
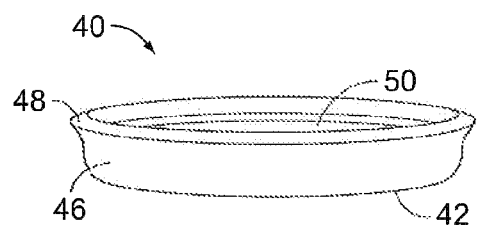
FIG. 3 illustrates a lateral view of a dual-phase spring assembly, according to an embodiment of the present invention.

FIGS. 2 and 3 illustrate isometric top and lateral views, respectively, of a dual-phase spring assembly 40, according to an embodiment of the present invention. The assembly 40 generally includes a drawn metal main body bonded to an internal rubber member.

Referring to FIGS. 2 and 3, the assembly 40 includes a drawn metal spring member that may be circular in axial cross-section. The assembly 40 includes a planar base 42 defining a central circular opening 44. A circumferential wall 46 is integrally formed with and extends upwardly from outer edges (i.e., an outer diameter) of the base 42.

An upper circumferential lip 48 of the wall 46 is angled radially away from a center x of the assembly 40. As described with respect to FIG. 5, the angled lip 48 is configured to assist in aligning the assembly 40 with respect to a fuel injector system. Moreover, the angled lip 48 also provides a stiff spring rate as it abuts the fuel injector system.

A molded rubber ring 50 is bonded to a ledge 52 (shown in FIG. 4) defined by an upper surface of the base 42. The molded rubber ring 50 may be any type of rubber material. With respect to the bonding process, a pre-treatment and adhesive are applied to the ledge 52 and an internal surface of the wall 46. Once the molded rubber ring 50 is molded to the metal surfaces, the assembly 40 is cured, thereby securely bonding the rubber ring 50 to the metal, preventing the rubber from peeling away from the metal.

Figure 4:
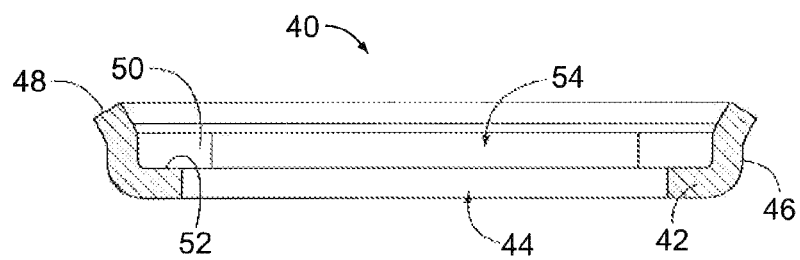
FIG. 4 illustrates a transverse cross-sectional view of a dual-phase spring assembly, according to an embodiment of the present invention.

FIG. 4 illustrates a transverse cross-sectional view of the dual-phase spring assembly 40. As shown, the molded rubber ring 50 is securely bonded to internal surfaces of the ledge 52 of the upstanding wall 46 below the angled lip 48. Alternatively, the rubber ring 50 may be bonded to more or less portions of the ledge 52 and wall 46 than shown in FIG. 4. The rubber ring 50 is within the assembly 40, as opposed to below or over the assembly 40.

Figure 5:
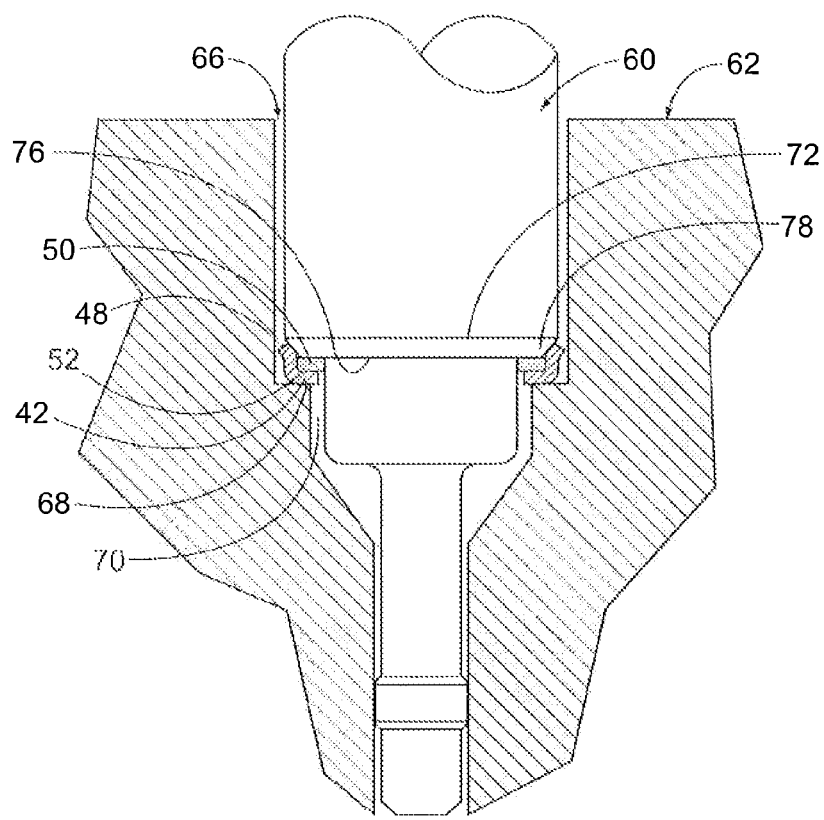
FIG. 5 illustrates a simplified front view of a fuel injector system within a cylinder head of an internal combustion engine, according to an embodiment of the present invention.

As shown in FIG. 4, the lip 48 angles radially away from a central axis of the assembly 40. That is, the lip 48 is canted away from the center of the assembly 40. Further, an internal edge of the rubber ring 50 extends into an internal chamber 54 past edges of the internal edge of the base 52, as shown in FIG. 5. In contrast to the metal lip 48, which provides a stiff spring rate, the rubber ring 50 dampens vibrations and provides a light spring rate.

FIG. 5 illustrates a simplified front view of a fuel injector system 60 within a cylinder head 62 of an internal combustion engine, according to an embodiment of the present invention. The fuel injector system 60 is similar to that shown in FIG. 1, except, instead of a metal isolation ring, the dual-phase spring assembly 40 is used.

The assembly 40 is positioned within main chamber 66 of the cylinder head 62 such that the metal base 42 seats on a ledge 68 above the tapered chamber 70 of the bore. As shown in FIG. 5, the rubber ring 50 extends past the edge of the base 42. As such, edges defining an internal opening of the rubber ring 50 abut directly into the main body 72 of the fuel injector system. Further, upper surfaces of the rubber ring 50 are sandwiched between the ledge 52 of the base 42 and horizontal base surfaces 76 of the main body 72 of the fuel injector system 60, thereby cradling the fuel injector system 60. The rubber ring 50 may secure the main body 72 through an interference fit or may alternatively be bonded to the main body 72.

As also shown in FIG. 5, the upper lip 48 is angled to conform to receive and securely retain a lower angled portion 78 of the main body 72. The metal upper lip 48 abuts directly into the main body 72 with no rubber therebetween.

The conformity of the upper lip 48 to the angled portion of the main body 72, in conjunction with the rubber ring 50 cradling the main body 72, as described above, secures the fuel injector system 60 in an upright position within the cylinder head 62. Because the assembly 40 contacts the fuel injector system 60 at metal (lip 48) and rubber (rubber ring 50) interfaces, the assembly 40 provides a dual-phase spring effect. The angle of the lip 48 ensures that the fuel injector system 60 remains properly aligned. The angled lip 48 and the rubber ring 50 cooperate to form a cup-like structure (with a central opening) that receives and retains a lower portion of the main body 72 of the fuel injector system 60.

The height datum of the fuel injector system 60 is controlled by the assembly 60. The height datum refers to the assembly 40 setting the injector tip location in the cylinder head 62. The height changes by extremely small amounts as the locating conditions change. However, as noted, the lip 48 maintains the fuel injector system 60 in proper alignment, due to its cooperating receiving angle with respect to the angled portion 78 of the main body 72. Accordingly, the height datum is controlled.

With respect to the dual-phase nature of the assembly 40, the first phase of the assembly 10 includes the rubber ring 50, which provides isolation and damping at low loads (e.g., engine idle, typically under 1000 N). The second phase of the assembly 10 is the angled lip 48 of the drawn metal, which provides durability and limits system movement at high loads (e.g., a wide open throttle condition when gasoline pressure increases greatly, typically up to 3500 N).

The damping effect of the rubber ring 50 prevents the fuel injector system 60 from resonating and generating airborne and structure borne noise. Structure borne noise is generally a vibration transferring from one component to another. Airborne noise is the audible noise a person hears from a ringing or vibrating object. Typically, airborne noise is generated from the injector system 60 itself, while structure borne noise is that transferred from the injector system 60 to the cylinder head 62. The rubber ring 50 dampens both types of nose.

In contrast to conventional isolation rings, embodiments of the present invention provide a dual-phase spring assembly that provides two distinctly different spring rates to provide isolation at low loads and limited movement at high loads. Embodiments of the present invention also serve to set the height datum for locating the injector tip in the combustion chamber. The bonded rubber ring 50 also provides damping effects to the injector system to limit vibration transfer from the injector system to the cylinder head. The damping effect of the rubber ring 50 also prevents the injector body from resonating and generating airborne and structure borne noise.

Figure 6:
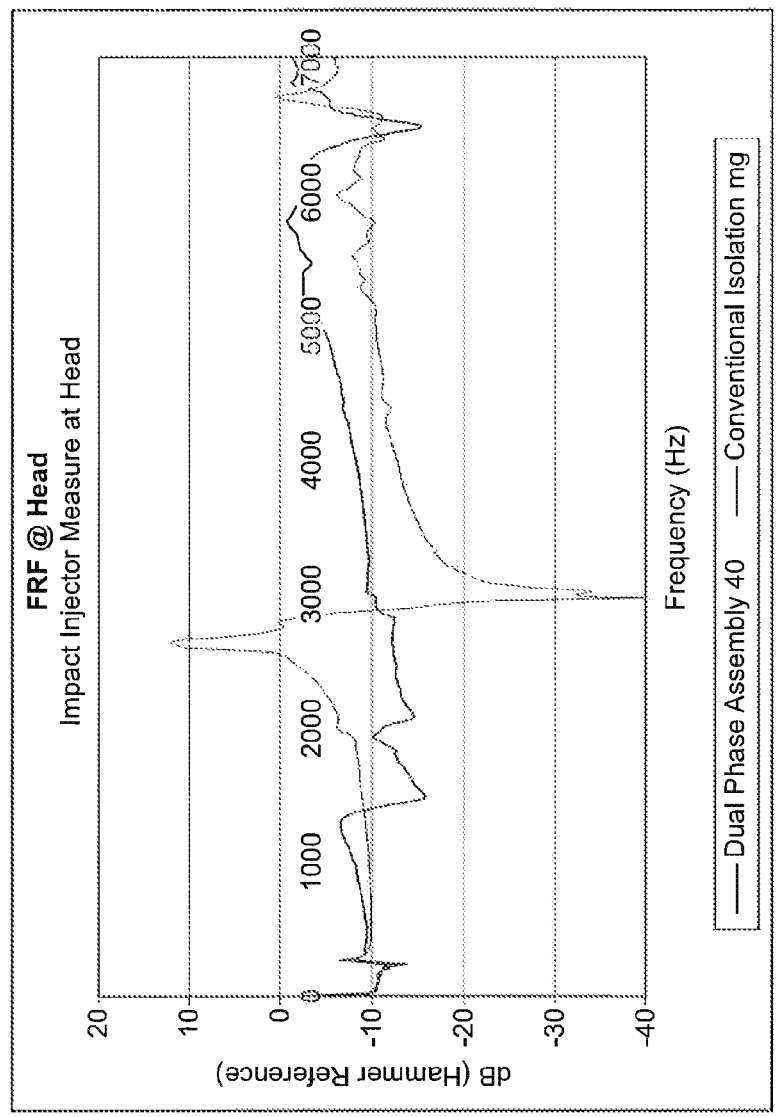
FIG. 6 illustrates a graph showing improved frequency response of the dual-phase spring assembly according to an embodiment of the present invention used with respect to a fuel injector system, as compared to a conventional isolation ring.
Figure 7:
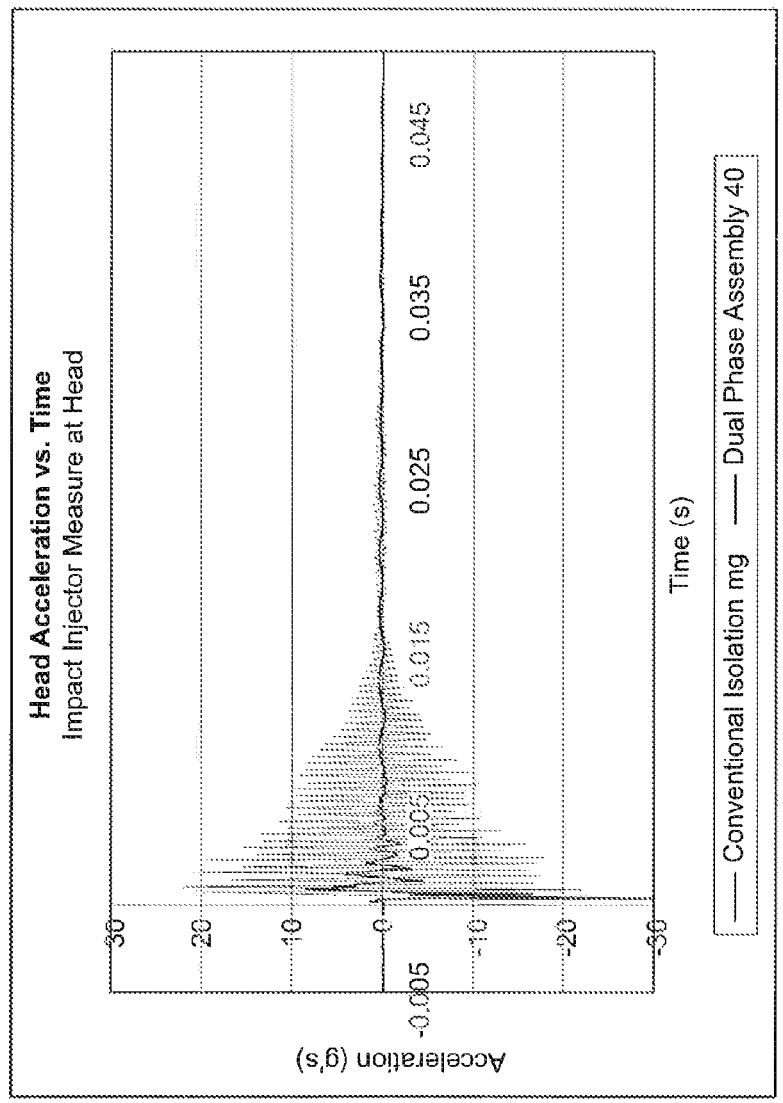
FIG. 7 illustrates a graph showing a damping effect of a dual phase spring assembly according to an embodiment of the present invention used with respect to a fuel injector system over time, as compared to a conventional isolation ring.

FIG. 6 illustrates a graph showing improved frequency response of the dual-phase spring assembly according to an embodiment of the present invention used with respect to a fuel injector system, as compared to a conventional isolation ring. FIG. 7 illustrates a graph showing a damping effect of a dual phase spring assembly according to an embodiment of the present invention used with respect to a fuel injector system over time, as compared to a conventional isolation ring. As shown in FIGS. 6 and 7, it has been found that embodiments of the present invention outperform the conventional isolation ring shown and described in FIG. 1.

Embodiments of the present invention provide an automatic system for alignment. The angle of the lip 48 is configured to keep the injector system vertical at all times in order to limit side loading on the combustion chamber injector seal. Accordingly, durability and performance of the seal are improved.

Moreover, the assembly 40 is captured to the injector body on its own, thereby eliminating the extra pieces that are typically used with respect to conventional systems.

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A dual-phase spring assembly configured for use with a fuel injector system, the assembly comprising:
   a metal main body comprising a base integrally connected to a circumferential wall having a radially-canted lip, said base defining a central opening, wherein said radially canted lip angles away from a center of said main body; and
   a rubber ring secured over said base and to an internal surface of said circumferential wall, said rubber ring covering a ledge of said base, said radially-canted lip being exposed, wherein said rubber ring is configured to directly abut at least a first portion of the fuel injector system, and wherein said radially-canted lip is configured to directly abut a second portion of the fuel injector system.

2. The assembly of claim 1, wherein said radially-canted lip and said rubber ring are configured to cooperate to securely retain the fuel injector system in an aligned position with respect to a cylinder head of an internal combustion engine.

3. The assembly of claim 1, wherein an inner edge of said rubber ring extends past an inner edge of said base towards said central opening.

4. The assembly of claim 1, wherein said radially-canted lip is angled to conform to a portion of the fuel injector system.

5. The assembly of claim 1, wherein said rubber ring is bonded to said base.

6. The assembly of claim 1, wherein said circumferential wall and said base define an internal cavity, wherein said rubber ring is contained within said internal cavity.

7. An internal combustion engine system, comprising:
   a cylinder head comprising a fuel injector bore having a main chamber in communication with a tapered chamber;
   a fuel injector comprising a main injector body and a tip axially extending from said main injector body, at least a portion of said main injector body being positioned within said main chamber, and at least a portion of said tip being positioned within said tapered chamber; and
   a dual-phase spring assembly aligning said fuel injector within said cylinder head, said dual-phase spring assembly comprising:
      a metal main body comprising a base integrally connected to a circumferential wall having a radially-canted lip, said base defining a central opening, wherein said radially canted lip angles away from a center of said main body; and
      a rubber ring secured over said base and to an internal surface of said circumferential wall, said rubber ring covering a ledge of said base, said radially-canted lip being exposed, wherein said rubber ring directly abuts at least a first portion of said main injector body, and wherein said radially-canted lip directly abuts a second portion of said main injector body.

8. The system of claim 7, wherein a lower portion of said base abuts a cylinder ledge proximate a location where said main chamber transitions to said tapered chamber.

9. The system of claim 7, wherein said rubber ring abuts a lower horizontal base portion of said main body and a vertical member of said main body.

10. The system of claim 7, wherein said radially-canted lip and said rubber ring cooperate to securely retain said fuel injector in an aligned position with respect to said cylinder head.

11. The system of claim 7, wherein an inner edge of said rubber ring extends past an inner edge of said base towards said central opening.

12. The system of claim 7, wherein said radially-canted lip is angled to conform to a portion of the fuel injector.

13. The system of claim 7, wherein said rubber ring is bonded to said base.

14. The system of claim 7, wherein said circumferential wall and said base define an internal cavity, wherein said rubber ring is contained within said internal cavity.

15. A dual-phase spring assembly configured for use with a fuel injector system, the assembly comprising:
   a main body comprising a base integrally connected to a circumferential wall having a radially-canted lip that angles away from a center of said main body, said base defining a central opening; and
   a rubber ring secured over a ledge of said base, said radially-canted lip being exposed, wherein said rubber ring is configured to directly abut at least a first portion of the fuel injector system, and wherein said radially-canted lip is configured to directly abut a second portion of the fuel injector system.

16. The assembly of claim 15, wherein said main body is formed of a first material, and said ring is formed of a second material, wherein said first material differs from said second material.

17. The assembly of claim 16, wherein said first material comprises metal, and said second material comprises rubber.

18. The assembly of claim 15, wherein said radially-canted lip and said rubber ring are configured to cooperate to securely retain the fuel injector system in an aligned position with respect to a cylinder head of an internal combustion engine, wherein an inner edge of said rubber ring extends past an inner edge of said base towards said central opening, and wherein said radially-canted lip is angled to conform to a portion of the fuel injector system.

19. The assembly of claim 15, wherein said rubber ring is bonded to said base.

20. The assembly of claim 15, wherein said circumferential wall and said base define an internal cavity, wherein said rubber ring is contained within said internal cavity.

* * * * *